(12) United States Patent
Ravi

(10) Patent No.: US 9,189,224 B2
(45) Date of Patent: Nov. 17, 2015

(54) FORMING AN UPGRADE RECOMMENDATION IN A CLOUD COMPUTING ENVIRONMENT

(71) Applicant: Oracle International Corporation, Redwood Shores, CA (US)

(72) Inventor: Kiran Vedula Venkata Naga Ravi, Belmont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 42 days.

(21) Appl. No.: 13/940,107

(22) Filed: Jul. 11, 2013

(65) Prior Publication Data

US 2015/0020061 A1 Jan. 15, 2015

(51) Int. Cl.
G06F 9/44 (2006.01)
G06F 9/445 (2006.01)
H04L 12/24 (2006.01)

(52) U.S. Cl.
CPC ............... *G06F 8/65* (2013.01); *H04L 41/082* (2013.01); *H04L 41/0883* (2013.01)

(58) Field of Classification Search
CPC ...... G06F 8/65; H04L 41/082; H04L 41/0883
See application file for complete search history.

(56) References Cited

U.S. PATENT DOCUMENTS

| | | |
|---|---|---|
| 2003/0041094 A1 | 2/2003 | Lara et al. |
| 2008/0071816 A1 | 3/2008 | Gray |
| 2008/0183878 A1 | 7/2008 | Panda et al. |
| 2010/0100970 A1* | 4/2010 | Roy-Chowdhury et al. ... 726/30 |
| 2010/0162226 A1 | 6/2010 | Borissov et al. |
| 2011/0289497 A1* | 11/2011 | Kiaie et al. .................. 717/171 |
| 2012/0102480 A1 | 4/2012 | Hopmann et al. |
| 2012/0179822 A1* | 7/2012 | Grigsby et al. .............. 709/226 |
| 2012/0192172 A1* | 7/2012 | Hansmann et al. .......... 717/168 |
| 2013/0227689 A1* | 8/2013 | Pietrowicz et al. ............ 726/23 |
| 2014/0059529 A1 | 2/2014 | Banavalikar et al. |
| 2014/0101646 A1 | 4/2014 | Buzaski et al. |
| 2014/0258382 A1* | 9/2014 | Tomer et al. ................. 709/203 |

OTHER PUBLICATIONS

Non-final Office Action dated Aug. 14, 2014 for U.S. Appl. No. 13/940,114.
Oracle, "Oracle Knowledge for RightNow Integration Guide", Release 8.5.1, Document No. OKIC-RN185-01, May 2013.
Final Office Action dated Jan. 23, 2015 for U.S. Appl. No. 13/940,114.
Non-Final Office Action dated Jun. 3, 2015 for U.S. Appl. No. 13/940,114.

* cited by examiner

*Primary Examiner* — Anna Deng
(74) *Attorney, Agent, or Firm* — Vista IP Law Group, LLP

(57) ABSTRACT

A method, system, and computer program product for forming cloud upgrade recommendations. The method commences by initiating an environment monitoring agent to run on a plurality of nodes within a cloud environment. The monitoring agent checks periodically for changes in the environment. When changes are detected, a process forms an upgrade recommendation, and sends the upgrade recommendation to recipients. An instance image includes a runnable copy of an environment monitoring agent, and nodes run respective instances of the environment monitoring agent. An upgrade recommendation comprises an upgrade path, which in turn includes recommendation of a processor model, or a device, and/or an operating system version, a software component, a middleware component, or a driver. The upgrade recommendation is formed based on a detected presence of at least one of, a directory on a file system, or a file on a file system or on the basis of detected port usage.

18 Claims, 7 Drawing Sheets

FORMING AN UPGRADE RECOMMENDATION IN A CLOUD COMPUTING ENVIRONMENT

RELATED APPLICATIONS

The present application is related to co-pending U.S. patent application Ser. No. 13/940,114, entitled "NON-INVASIVE UPGRADES OF SERVER COMPONENTS IN CLOUD DEPLOYMENTS", filed on even date herewith, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of enterprise software configuration and more particularly to techniques for forming an upgrade recommendation in a cloud computing environment.

BACKGROUND

Cloud-based provisioning of infrastructure as a service (IaaS), platform as a service (PaaS), and software as a service (SaaS) has gained in popularity. Various tools to assist a customer to bring up an initial deployment of IaaS or PaaS or SaaS have emerged and customers have access to an ever-broadening array of infrastructure, platforms, and software, yet ongoing improvements to the infrastructure or platform or software provided as a service often occur without awareness by the end-customers. In some cases customers do not want to know about changes (e.g., leaving hardware management, upgrades and infrastructure improvements to the IaaS cloud vendor); the end customer might not ever even know of such improvements. However, in other cases, the end-customer might want to know about new offerings (e.g., a new software application or a new feature, etc.) and might want to perform a periodic assessment of the end-customer's configuration. In some cases (esp., in PaaS deployments) customers provide custom software, and would want to know about changes underlying the services of the PaaS offering.

Further, a cloud vendor might realize that certain software application offerings and/or certain feature offerings in their SaaS can be used as a competitive differentiator and/or for increasing usage and customer satisfaction.

Unfortunately, there are no tools or computer-aided capabilities that could assist the vendor to identify new software application offerings and/or new feature offerings in their SaaS that can be used as a competitive differentiator and/or for increasing usage and customer satisfaction. Accordingly, both cloud vendors and their customers are unaware of value that can be seized upon by both parties.

Moreover, none of the aforementioned technologies have the capabilities to perform the herein-disclosed techniques for forming an upgrade recommendation in a cloud computing environment. There is a need for an improved approach.

SUMMARY

The present disclosure provides an improved method, system, and computer program product suited to address the aforementioned issues with legacy approaches. More specifically, the present disclosure provides a detailed description of techniques used in methods, systems, and computer program products for forming an upgrade recommendation in a cloud computing environment.

The method commences by initiating an environment monitoring agent to run on a plurality of hosts within a cloud environment. The monitoring agent runs continuously or periodically to check for changes in the environment. When changes are detected, a monitoring engine forms an upgrade recommendation (e.g., based at least in part on environment changes detected by the environment monitoring agent), and then sends the upgrade recommendation to a recipient. In the cloud environment, the environment monitoring agent is included in an instance image, and a plurality of nodes run a respective instance of the environment monitoring agent. An upgrade recommendation comprises an upgrade path, which in turn includes recommendation of a processor, a processor model, a processor stepping, or a device, and/or an operating system version, a software title, a software component, a middleware component, or a device driver. The upgrade recommendation is formed based on a detected presence of at least one of, a directory on a file system, or a file on a file system or on the basis of detected port usage.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

DETAILED DESCRIPTION

Figure 1:
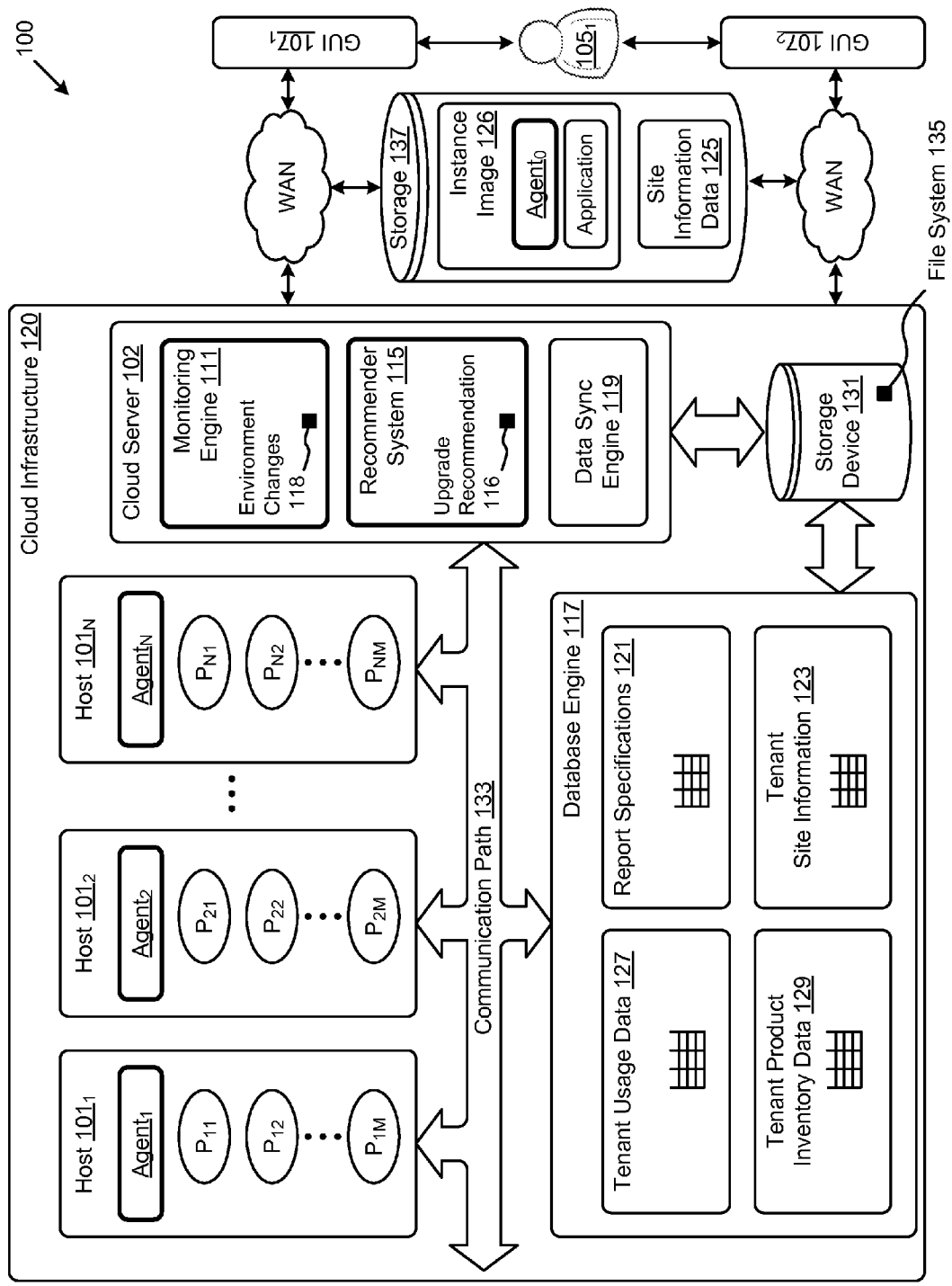
FIG. 1 depicts a single instance of a cloud deployment in which techniques for forming an upgrade recommendation can be practiced, according to some embodiments.

Some embodiments of the present disclosure address the problem of global cloud configurations and upgrade paths, and some embodiments are directed to an improved approach for forming upgrade recommendations in a multiple instance global cloud computing environment. More particularly, disclosed herein and in the accompanying figures are exemplary environments, methods, and systems for forming an upgrade recommendation in such a global cloud computing environment.

Overview

Cloud service vendors provide customers with various configurations of services, for example:

Infrastructure as a Service (IaaS),
Platform as a Service (PaaS), and
Software as a Service (SaaS).

In the above example cases, the configuration underlying the service can change or improve over time. For example, new processors, a new processor model or a new processor stepping and/or new devices may become available, new operating systems and/or operating system versions may become available, and/or other forms of new software (e.g., new applications, new middleware, new driver software, etc.) may become available.

Mixed Hardware and Software Scenario

Customers who subscribe to one or more of such packaged cloud services do so in order to run software applications in a particularly-configured (e.g., user-configured or vendor-configured) environment offered by the vendor for a fee (e.g., a lease fee or measured usage fees), and customers of such packaged cloud services have certain expectations of baseline functionality and baseline performance. For example, a customer can lease a farm of Linux machines (e.g., machines formed of dual-core processors) and run a LAMP stack application (Linux Apache Mysql Php) on these machines. Similarly, a PaaS service comprising a database server and/or middleware can be specified, and the customer might run a suite of business applications in conjunction with the services provided by the middleware and database server. In some cases, in particular under the PaaS service model, the foregoing scenario can be extended to offer an environment for mixed execution where customer-provided software is executed in conjunction with the cloud vendor's software offering.

Mixed Execution Scenario

Mixed execution is characterized by the situation whereby a portion of a particular application is provided (e.g., using software that is owned, developed or hosted by the cloud vendor) such as under a SaaS or PaaS service model, and a portion is developed and provided by the customer (e.g., an application extension or plug-in).

Further to this example, customers tend to focus resources on development and maintenance of the business and/or the application at hand (e.g., customer-delivered feature/function development and ongoing maintenance). At the same time, cloud vendors know that their customers can potentially benefit from ongoing improvements in the infrastructure, platform and/or software offerings. Strictly as one example, a cloud vendor might qualify a new monitoring tool, or a new performance tuning tool, either or both of which might be advantageously used by the customer's development team. Yet, until the development of the herein-disclosed techniques, there have persisted barriers in the way of a smooth path for customers to avail themselves of the continuous improvements provided by the cloud vendors within the aforementioned mixed execution scenario.

Barriers

Cloud vendors do not have a way to identify, recommend, offer and provision services based on custom software run by their clients on the above cloud services. In some cases, the cloud vendor might not even know the specifics of what portion of the particular application is being developed and provided by the customer, and thus a cloud vendor might not be in a position to make recommendations to their customers.

In absence of the recommendations as provided by practice of the herein-disclosed techniques, customers may unwittingly suffer higher than necessary costs, and/or may unwittingly suffer lower-than-available performance, and/or may unwittingly suffer from the presence of or effects of feature-limited or obsoleted services.

For the cloud vendors, this fact set presents a lost opportunity due to failure to identify customer needs. Even if personnel (e.g., sales personnel) were able to recognize such a customer need, it often happens that an organizational/communication barrier exists in situations where the vendor-to-customer relationship is managed at a CTO/CFO level—whereas the design and implementation activities pertaining to the portion of the particular application that are developed and provided by the customer are often done at Engineering Director levels and below. Absent the herein-disclosed approaches, the existence of revenue and improved service opportunities may not be recognized by the cloud vendor, and thus, upgrade recommendations may not be communicated to their customers.

In addition to the aforementioned occurrences of lost opportunities, further problems arise due to performance and security issues in the software stack. Strictly as one example, a customer running a potentially unstable version of software in the IaaS or PaaS environment can create problems not only for themselves, but also for the tenants hosted in the same IaaS or PaaS environment. Even when virtualized, certain programs can inflict performance penalties and can introduce security vulnerabilities to the underlying software. For example, certain Open Source applications have stability issues that may cause software and/or hardware failures (e.g., overheated disks, network clog, denial of services, etc.).

Definitions

Some of the terms used in this description are defined below for easy reference. The presented terms and their respective definitions are not rigidly restricted to these definitions—a term may be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1 depicts a single instance of a cloud deployment 100 in which techniques for forming an upgrade recommendation can be practiced. As an option, the present cloud deployment 100 or any aspect thereof may be implemented in the context of the architecture and functionality of the embodiments described herein.

As shown, the cloud environment (e.g., cloud infrastructure 120) comprises a plurality of interconnected computing machines deployed as a plurality of hosts (e.g., host $101_1$, host $101_2$, host $101_N$, etc.) configured for communication over a communication path 133 to a database engine 117 and a cloud server 102. The cloud infrastructure can be configured by an administrator and/or by a user $105_1$. Further, a user can access and configure the cloud server 102 via a graphical user interface (e.g., GUI $107_1$) and/or a user can access and configure the database via a graphical user interface (e.g., GUI $107_2$). Such a user might also configure (e.g., initially configure and/or maintain) site storage 137, which contains an instance image 126. Such an instance image 126 comprises an instance image copy of an application and an instance image copy of an agent. Site storage 137 might also contain an initial copy of site information data 125.

Any host (e.g., host $101_1$, host $101_2$, host $101_N$, etc.) can host software and can execute processes. Any host can communicate with any other host, can communicate with the database engine, and can communicate with the cloud server 102. More particularly, hosts can run instances of an environment monitoring agent (e.g., $agent_1$, $agent_2$, $agent_N$, etc.) and other processes (e.g., $P_{11}$, $P_{12}$, $P_{1M}$, ... $P_{NM}$, etc.). The processes can be run on "bare metal", or can be run under an operating system or hypervisor. In exemplary embodiments, the agent running on each host communicates with the cloud server 102. Various particular functions of the agent running on each host are discussed below, in FIG. 2, and elsewhere in this disclosure.

The database engine 117 serves as a repository for data, which data can be stored and accessed as a relational database relation, or as a file, or as a memory-resident data structure. As shown, database engine 117 comprises tenant usage data 127, tenant product inventory data 129, report specifications 121, and tenant site information 123.

In the particular embodiment of FIG. 1, a vendor-built agent (e.g., $agent_0$) is accessible to the cloud infrastructure (e.g., over a WAN) and each host runs its own instance of the agent (e.g., $agent_1$, $agent_2$, $agent_N$, etc.). The agent program performs at least the following functions to identify environment changes:

Identify new software installed,
Identify new software being run,
Identify changes to or new network usage, and
Identify changes to or new file usage.

The agent sends this information to a cloud server 102 using any protocol (e.g., HTTP, SOAP web services, REST, socket interactions, etc.). In exemplary deployments, such protocols are supported by the cloud vendor; however, it is possible that certain communications between the cloud server 102 and agents can be performed using custom protocols.

The cloud server 102 runs a monitoring engine 111, a recommender system 115, and a data sync engine 119. The cloud server and any process it runs can access any host and can access the storage device 131 either natively (e.g., via a file protocol) or via a database engine connection, possibly using a query language such as SQL. The monitoring engine 111 can access any aspect of any host. In the event that the bare metal or hypervisor software does not natively provide access to any particular aspect of the corresponding host, the agent image (e.g., $agent_0$) can be configured to provide the needed access using any protocol.

Analysis while Observing Security and Privacy Policies

In the context of performing operations for practicing the techniques disclosed herein, the agent need not read or transmit any secure information. The cloud server analyzes the data sent by agents and using the following configuration and installation characteristics. Such characteristics may be based on a machine-readable repository that might be maintained and updated by the cloud vendor (e.g., a file system 135 or other persistent storage on or in the storage device 131), and can consist of:

Software titles: Installed components, installed versions, specific configurations, etc.
Topology: Description of computing and communication fabric and/or any distributed configuration information.
Knowledge base: Known performance issues and known vulnerabilities of the software or hardware.

The monitoring engine 111 serves to collect cluster-wide data, and can be used to collect data that may not be convenient for the individual host-resident agents to collect. Strictly as examples, the monitoring engine 111 serves to snoop on network access ports and on file system access ports, and on database engine connections in order to collect usage data. Commercially-available or custom software can be used to monitor, enhance or complement the above described machine-readable repository.

Recommender System Overview

The recommender system 115 consolidates the data from the agents and/or from the monitoring engine, forms an upgrade recommendation 116 and notifies the customer with recommendations (e.g., of possible upgrade configurations). It is to be appreciated that the cloud server can recommend removal of unused services (e.g., that can potentially be removed to reduce a memory footprint, etc.). The customer can review the recommendation and can decide to adopt some, all or none of the proposed recommendations. The recommendations can be formatted to any format (e.g., formats that facilitate ease of communication and ease of human understanding). If the customer selects some or all services (e.g., by adopting one or more recommendations), the cloud server (e.g., a component of the recommender system 115) receives the customer selection. The cloud server can notify some, none, any, or all of the agents to download the selected software and/or configurations, and the agent can facilitate configuration of the customer's selected upgrades to software and services. Further, some embodiments notify the availability of the customer's selected upgrades to software and services. In some cases an upgrade is performed across multiple cloud deployments (e.g., in a global cloud situation), and upgrade notifications are amalgamated for ease of reporting and human understanding.

As heretofore described, the agents interact with the cloud server forming an upgrade recommendation, and for carrying out the installation and configuration of components pertaining to adoption/deployment of the customer-selected recommendations. Various embodiments of agents in conjunction with a cloud server are briefly discussed in FIG. 2.

Figure 2:
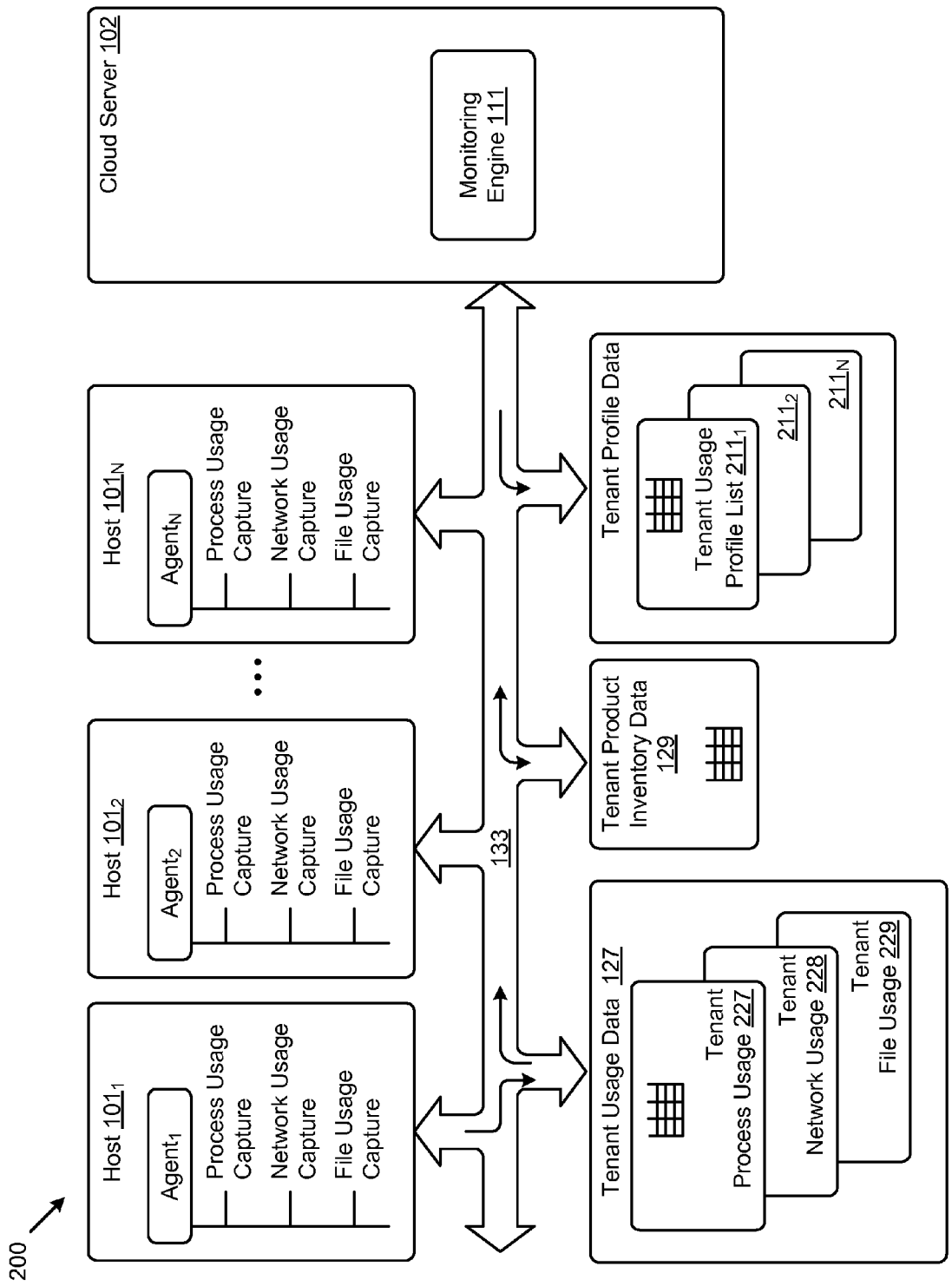
FIG. 2 shows a portion of a cloud deployment in which a cloud server is used for forming an upgrade recommendation in a cloud computing environment, according to some embodiments.

FIG. 2 shows a portion of a cloud deployment 200 in which a cloud server is used for forming an upgrade recommendation in a cloud computing environment. As an option, the present cloud deployment 200 or any aspect thereof may be implemented in the context of the architecture and functionality of the embodiments described herein. Also, the cloud deployment 200 or any aspect thereof may be implemented in any desired environment.

As shown, an agent program (e.g., $agent_1$, $agent_2$, $agent_N$, etc.) running on each host monitors environment changes. As examples and as shown, an agent program runs on each host to capture a listing of running processes (e.g., see process usage capture, as shown), network usage changes (e.g., see network usage capture, as shown) and file changes (e.g., see file usage capture, as shown). The agent reports updates (e.g., snapshots) to cloud server 102. The agent is initially configured with a baseline starting point and provides updates when there are observed changes in the environment.

The cloud server receives reports from the agent programs, and/or self-monitors changes in the cloud environment (e.g., using monitoring engine 111 to detect environment changes 118 that would affect a particular tenant) and stores tenant usage data. The tenant usage data (see tenant usage data 127) can be segregated into a partition for storing tenant process usage data (e.g., see tenant process usage 227), a partition for storing tenant network usage data (e.g., see tenant network usage 228), and a partition for storing tenant file usage data (e.g., see tenant file usage 229). Such storage can be persisted using any known methods including in a database, in a file system, or in a memory-resident data structure.

In addition to detecting the above changes, the agents and/or monitoring engine can recognize the event of new programs being installed in several ways. For example, newly-detected presence of a particular file and/or newly-detected presence of a particular directory on a file system can be indicative of a newly-installed program or program component. Some other possible implementations are described below.

The agent selects a particular subscriber to the cloud services (e.g., a tenant), and then identifies the processes, networks and files specific to the tenant. Various functions of a host operating system or virtual machine can access the process subsystem, the network subsystem, and/or the file I/O subsystem, and can detect the foregoing changes using any of a range of API, middleware and/or OS calls. The specific API calls and commands used to fetch this data vary based on OS, configuration and hardware. Regardless of the access technique, changes to the process subsystem, the network subsystem, and the file I/O subsystem can be detected and captured.

The running processes can be captured periodically using a script. Such a script is listed in the form of pseudo-code for monitoring and capture operations. See Table 1.

TABLE 1

| | Periodic capture of running process | |
|---|---|---|
| Line | Operation | Comment |
| 1 | Crontab → * * 0,5,10,15,20 * * monitor.sh | Run every 5 hrs |
| 2 | old=`cat /root/agentX/baseline.bin` | # read baseline.bin |
| 3 | new=`ps -auwww \| awk '{print $3, $4, $5}' \| sort` | # read new processes and send in tenant identification as arguments |
| 4 | diff old new > difference.txt | Create a difference file |
| 5 | diff old lsof >> difference.txt | Append to difference file |

A difference file (e.g., difference.txt) can be formatted for easy reading by a human operator or administrator. Or, a difference file can be formatted for easy reading by a process such a monitoring engine 111. A sample difference file is given in Table 2.

TABLE 2

| | Sample difference file | |
|---|---|---|
| Line | Operation | Comment |
| 1 | Tenant: Acme.com(Id: 14565) | Give tenant ID |
| 2 | Host: vhost1.int.us.oracle.com Internal IP: 155.25.66.26 CPU:4 OS:RHEL5.0 | Hostname and/or or IP address that the agent is running on. May include the operating system. |
| 3 | New: /var/proc/xmlrpc-server -S 10 -THREADS=true -CONF-DIR=/etc/rpc/xml-rpc.conf . . . | New process detected on this host. New install directory change detected. |
| 4 | New: /apps/oracle/oracle-11g-home/bin/sqlldr -file=/tmp/daily/txn-12455.csv -database=FIN | New process detected on this host. New program component (and operation) detected via temporary file found in /tmp directory. |
| 5 | New: /etc/init.d/sftpd -port 4444 | New process detected on this host. New port usage is detected. |
| 6 | Unused: /etc/httpd/apachectl | A process that was detected earlier is found to be no longer running. |

Sample Product Inventory

The cloud sever receives updates from agents, then identifies and correlates the new processes. The cloud sever maintains an inventory of the software available. An example of such an inventory is shown as tenant product inventory data 129 (see FIG. 1 and FIG. 2) and sample contents are given in Table 3.

TABLE 3

| Product inventory component patterns | | | |
|---|---|---|---|
| Product Component | Process Pattern | Network Ports | File Pattern |
| Enterprise SQL Loader | *bin/sqlldr* | 1523 | /var/log/sqlldr/* |
| FTPProServer | Sftpd | 2220 | /var/log/sftp |
| FTPMonitor | Sftpd | 2220 | /var/log/sftp |
| SQLTransformer | Sqlldr, sqlplus | N/A | N/A |

A particular product can be identified by a title and/or by a component name (e.g., "Enterprise SQL Loader", "FTPProServer", etc.) and can be further identified by a process pattern, its usage of network ports, and by a file pattern. In the embodiment of FIG. 2, the process pattern is a Linux process name, the network ports are the ports used by the process, and the file pattern is a file path to the executable of the corresponding process.

The aforementioned tenant usage data (see tenant usage data 127) can be persisted for later processing. In particular, any number of snapshots can be correlated to identify changes over time. In some cases a change might be a transient (e.g., invocation of a process to handle a fault condition, etc.) and such a transient occurrence can be filtered out by a monitoring engine. The cloud server (e.g., using monitoring engine 111) can perform such filtering and store filtered data in the form of tenant profile data (e.g., tenant usage profile list $211_1$, tenant usage profile list $211_2$, tenant usage profile list $211_N$, etc.), possibly partitioned into one file or relation per tenant, as shown.

Additional analysis of snapshots and techniques for making recommendations are discussed in FIG. 3 below.

Figure 3:
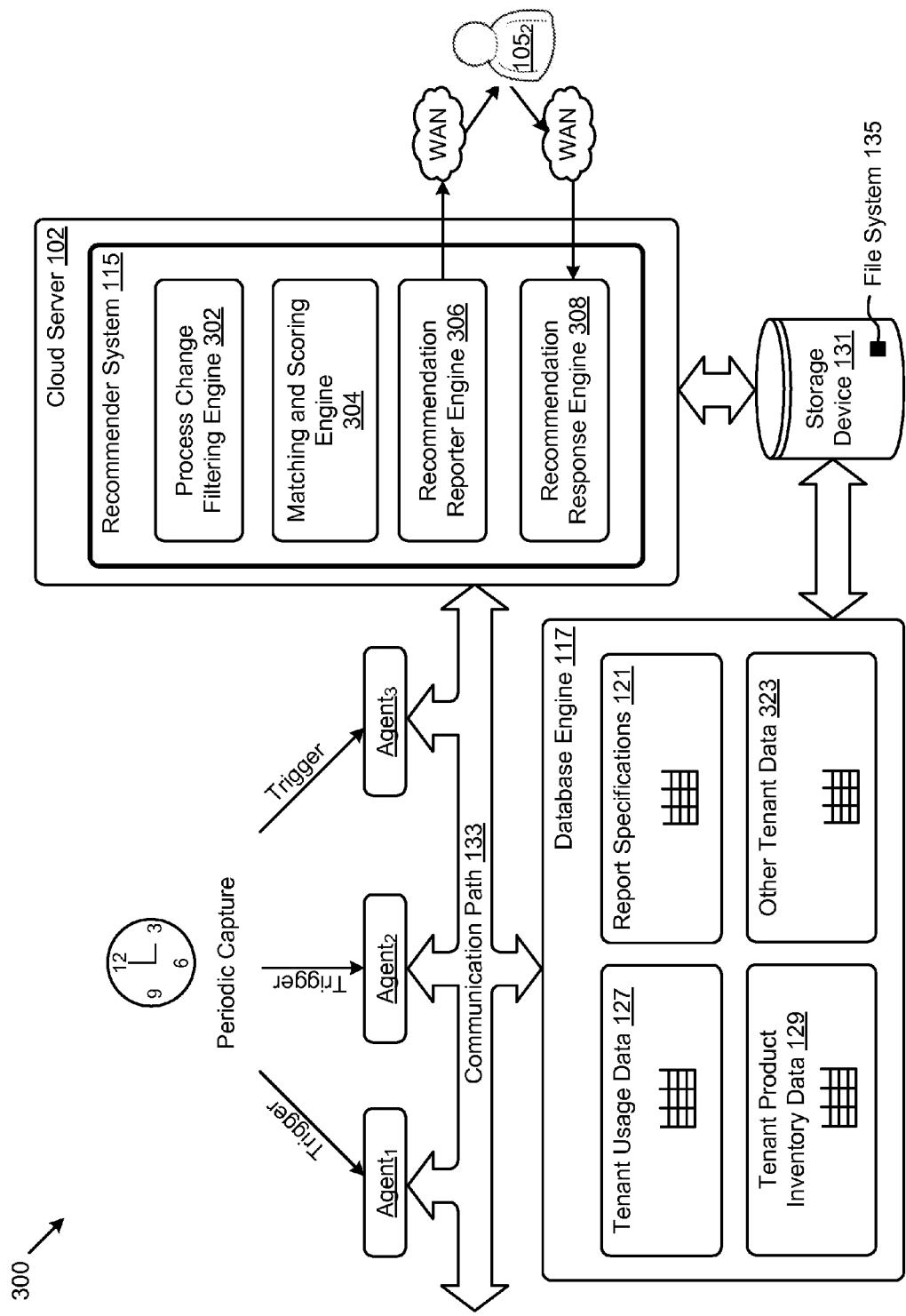
FIG. 3 exemplifies a subsystem for automatically forming an upgrade recommendation in a cloud computing environment, according to some embodiments.

FIG. 3 exemplifies a subsystem 300 for automatically forming an upgrade recommendation in a cloud computing environment. As an option, the present subsystem 300 or any aspect thereof may be implemented in the context of the architecture and functionality of the embodiments described herein. Also, the subsystem 300 or any aspect thereof may be implemented in any desired environment.

As shown, the cloud server comprises a recommender system 115, which in turn comprises a process change filtering engine 302, a matching and scoring engine 304, a recommendation reporter engine 306, and a recommendation response engine 308. The cloud server communicates over communication path 133 to the database engine 117, possibly using a query language to retrieve tenant usage data 127, tenant product inventory data 129, report specifications 121, and other tenant data 323.

Referring again to the discussions of FIG. 1 and FIG. 2, the shown embodiments introduce an example inventory listing (e.g., see tenant product inventory data 129 and Table 3). The recommender system operates as follows: When the cloud server receives tenant process usage data 127 from agents on two or more hosts, the recommender system 115 is triggered to parse the snapshots within tenant usage data 127 and compare the values with the tenant product inventory data 129. Based on the coding of the process patterns, network ports, and file patterns, the recommender system identifies products that the customer is running. Following the example of Table 3, this could include an SQL Loader (see occurrence of "/bin/sqlldr") and SFTP services (see occurrence of "/etc/init.d/sftpd"). Thus, in this example, the customer is running an FTP service that receives files from customer hosts, and uses "/bin/sqlldr" to load the data into the customer database. The recommender system 115 identifies this as two processes using "/bin/sqlldr" and "/etc/init.d/sftpd". Additional identifications, correlations and inferences can be made from the combination of tenant usage data 127 and tenant product inventory data 129.

Given such a recommendation, a customer notification can be formed. In some cases tenant product inventory data 129 comprises a description of the product component. An example is given in Table 4.

TABLE 4

Product inventory recommendation story

| Product Component | Description |
|---|---|
| Enterprise SQL Loader | Improved to handle loading of large amounts of data with high reliability over networks. Includes automatic restart capability. |
| FTPProServer | An enterprise class, vendor managed FTP server that has high-scale data loading performance. |
| FTPMonitor | Monitor: Sftpd is deprecated. |
| SQLTransformer | Options include: Sqlldr, sqlplus. |
| MicroPCAdv | New dependencies/requirements: Requires VM version 3.2. |

The recommender system is configured to notify the customer. In this example, the recommendation reporter engine 306 notifies the customer of two components using a high priority recommendation:

Enterprise SQL loader: Improved to handle loading of large amounts of data with high reliability over networks. Includes automatic restart capability.

FTPProServer: An enterprise class, vendor managed FTP server that has high-scale data loading performance.

A recommendation score can be computed based on the weighted score of the similarity of a process based on a combination of process name, file identification and port number match. For example, a process that matches in file path, process name and network port might result in a higher recommendation score than a process that only matches against a network port.

The recommendation reporter engine 306 also provides a lower priority recommendation of an upgrade path to the FTPMonitor and might also provide a lower priority recommendation of an upgrade path to the SQLTransformer.

Using this approach, the cloud vendor is able to identify one or more hardware or software upgrade paths, and can proactively provide customers with upgrade path choices. In some situations, customers can respond to a notification of recommendations using a protocol that allows the customer to opt-in to any one or more recommendations merely by using a checkbox or other indication in the response.

Strictly as an example, assume that the customer views the recommendation and wishes to pursue an upgrade path using FTPProServer, but does not want to migrate to Enterprise SQLLoader at this time. A process or engine in the cloud server (e.g., recommendation response engine 308) can receive such selections from a user $105_2$. In some cases further processing is undertaken; for example, the recommendation response engine 308 can generate a "New Order Form" and send the new order to recipients (e.g., one or more users and/or administrative personnel) who manage the cloud for the tenant. In turn the provisioning system can be configured to deploy the selected product(s).

In some case, customers can start using the selected product(s) immediately. However, in some cases, a customer may choose to configure the newly selected product(s) to match their specific needs. A similar approach would work for identifying a low performance software title or a low performance software component that can impact hosts. Low performance software is identified using the process name, network port and the existence of files (log files, configuration files, and/or other well know file locations). When identified, a recommendation is generated to upgrade the low performance software, or remove the low performance software, or otherwise recommend an alternative software configuration.

Recommendations Upon Detection of Destabilizing Configurations

In this example, assume that the difference files from the snapshots indicated a new process, namely "MicroPCAdv". Table 5 presents an example of such a difference file.

TABLE 5

Sample difference file (destabilizing configuration)

| Line | Operation |
|---|---|
| 1 | Tenant: Acme.com(Id: 14565) |
| 2 | Host: vhost2.int.us.oracle.com Internal IP: 155.25.66.27 CPU:4 OS:RHEL5.0 |
| 3 | New: /usr/local/bin/MicroPCAdv |

Further, assume that MicroPCAdv employs kernel level APIs to access hardware resources and may cause a virtual machine (VM) to panic (crash). The recommender system can identify the usage pattern of the new process "MicroPCAdv" and can then notify the cloud vendor that this process is known to destabilize certain virtual hosting environments. The cloud vendor can then take appropriate actions, possibly in conjunction with the tenant's IT staff to proactively address this potentially destabilizing situation.

Figure 4:
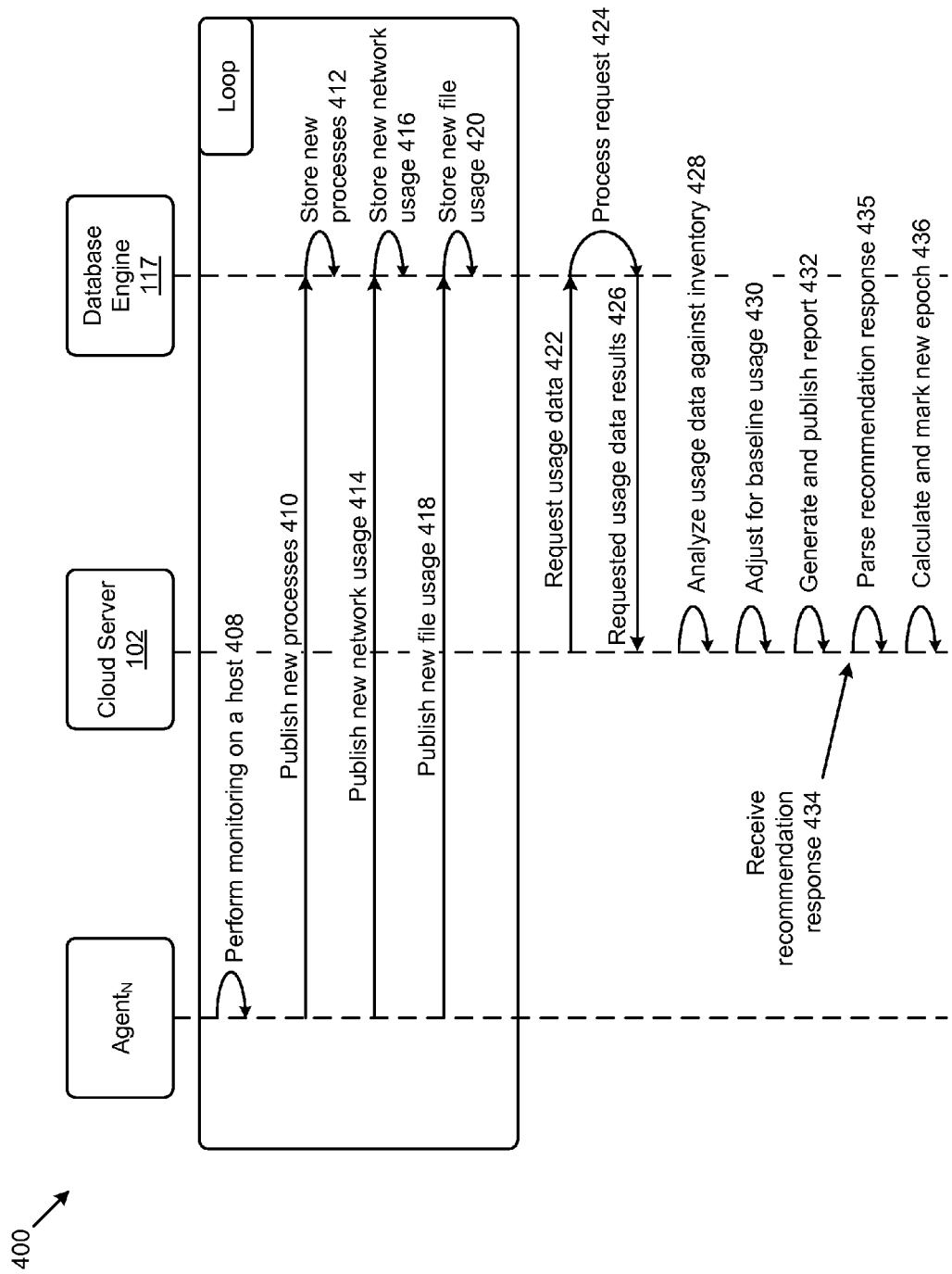
FIG. 4 depicts a protocol between a cloud server, an agent, and a database engine in a protocol exchange for automatically forming an upgrade recommendation in a cloud computing environment, according to some embodiments.

FIG. 4 depicts a protocol 400 between a cloud server, an agent, and a database engine in a protocol exchange for automatically forming an upgrade recommendation in a cloud computing environment. As an option, the present protocol 400 or any aspect thereof may be implemented in the context of the architecture and functionality of the embodiments described herein. Also, the protocol 400 or any aspect thereof may be implemented in any desired environment.

As shown, the protocol 400 is between three actors, namely an agent agent$_N$, a cloud server 102, and a database engine 117. The agent agent$_N$ performs monitoring on a host (see operation 408), and publishes findings. The publishing of findings comprise a message to publish new processes (see message 410), a message to publish the new network usage (see message 414), and a message to publish the new file usage (see message 418). The contents (e.g., usage data) of the foregoing messages are respectively stored by the database engine 117 (see operation to store new processes 412, operation to store new network usage 416, and an operation to store new file usage 420).

At some point in time the data stored by the database engine can be retrieved via a query (see operation to query usage data 422). The database engine processes the query (see operation 424) and returns the usage data query results 426 to the requestor, in this case to the cloud server 102. The cloud server 102 then analyzes the retrieved usage data against inventory (see operation 428) adjusts for baseline usage (see operation 430), and generates (and publishes) a report (see operation 432). In some situations, the cloud server asynchronously receives a response to the recommendation (see asynchronous message 434), which message is parsed by the cloud server (see operation 435). The result of the parsing might be an automatic deployment of the customer-adopted recommendations (e.g., see recommendation response engine 308 as discussed above). In other cases no response to the recommendation is received.

To control the scope of any initial recommendation a baseline usage image metric is employed. For example, an initial (e.g., base line) image is generated by listing a set of processes, ports, and files as are detected when a host is first introduced into the cloud. Such a baseline can be generated and recorded by the agent running on that host.

To limit the frequency of re-reporting of recommendations, the concept of an epoch, its metric, and its usage is introduced. An epoch describes a time period between recommendations that are sent to a particular tenant, or an epoch can be defined by a number of recommendations sent to a particular tenant. In some cases (e.g., in the case of a high-priority recommendation) it is entirely appropriate to repeat a recommendation made in a previous epoch. In other cases, it is less appropriate. The protocol 400 as shown concludes with an operation to calculate and mark a new epoch (see operation 436).

Additional Embodiments of the Disclosure
Practical Applications

Figure 5:
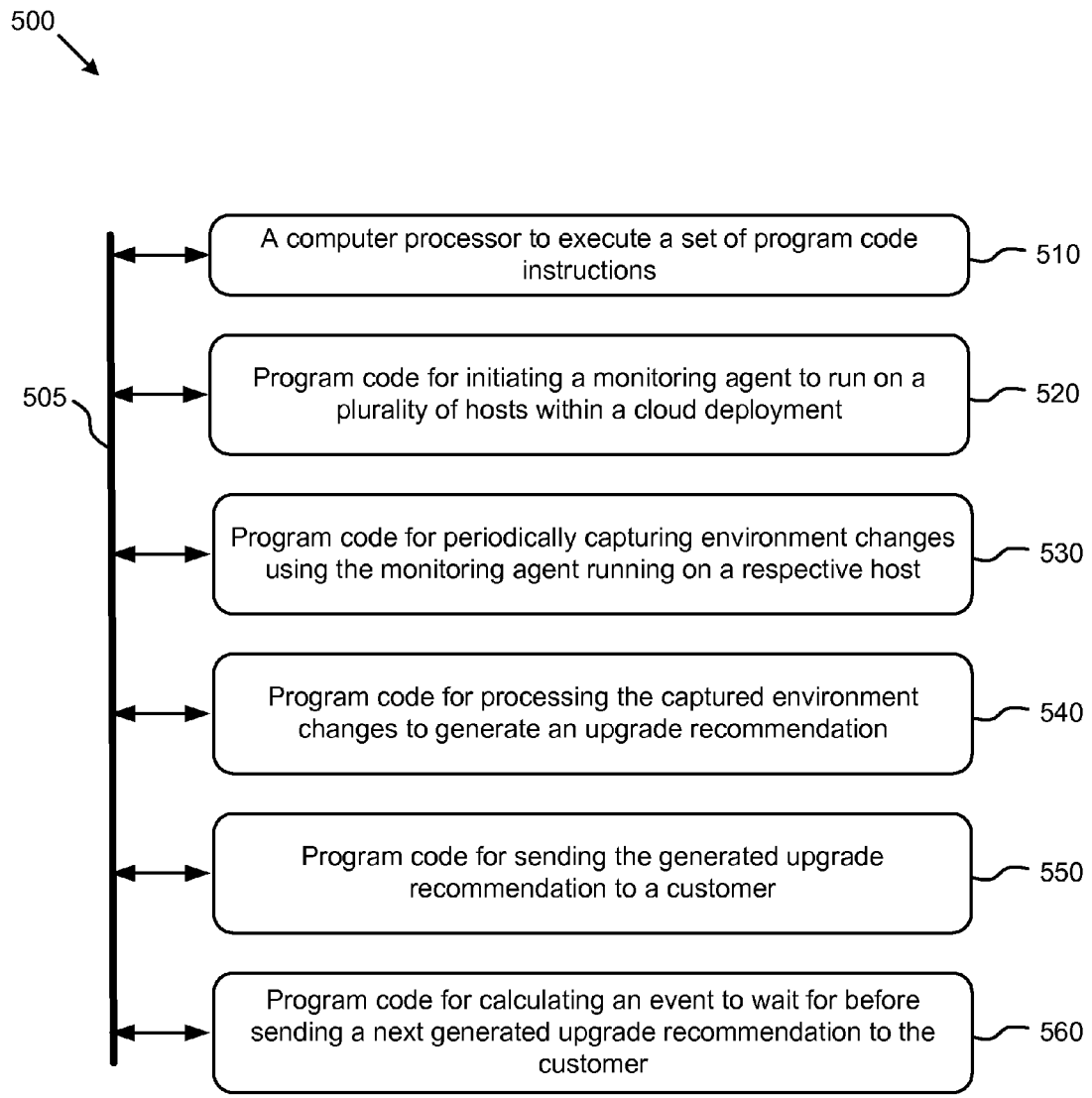
FIG. 5 is a block diagram of a system for forming an upgrade recommendation in a cloud computing environment, according to some embodiments.

FIG. 5 is a block diagram of a system 500 for forming an upgrade recommendation in a cloud computing environment. As an option, the present system 500 may be implemented in the context of the architecture and functionality of the embodiments described herein. Of course, however, the system 500 or any operation therein may be carried out in any desired environment.

As shown, system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with other operations over communication path 505. The modules of the system can, individually or in combination, perform method operations within system 500. Any operations performed within system 500 may be performed in any order unless as may be specified in the claims. The embodiment of FIG. 5 implements a portion of a computer system, shown as system 500, comprising a computer processor to execute a set of program code instructions (see module 510) and modules for accessing memory to hold program code instructions to perform: initiating a monitoring agent to run on a plurality of hosts within a cloud deployment (see module 520); periodically capturing environment changes using the monitoring agent running on a respective host (see module 530); processing the captured environment changes to generate an upgrade recommendation (see module 540); sending the generated upgrade recommendation (see module 550) to a recipient (e.g., a user, customer); and calculating an event to wait for (e.g., a wait-for event) before sending a next generated upgrade recommendation to the recipient (see module 560).

Figure 6:
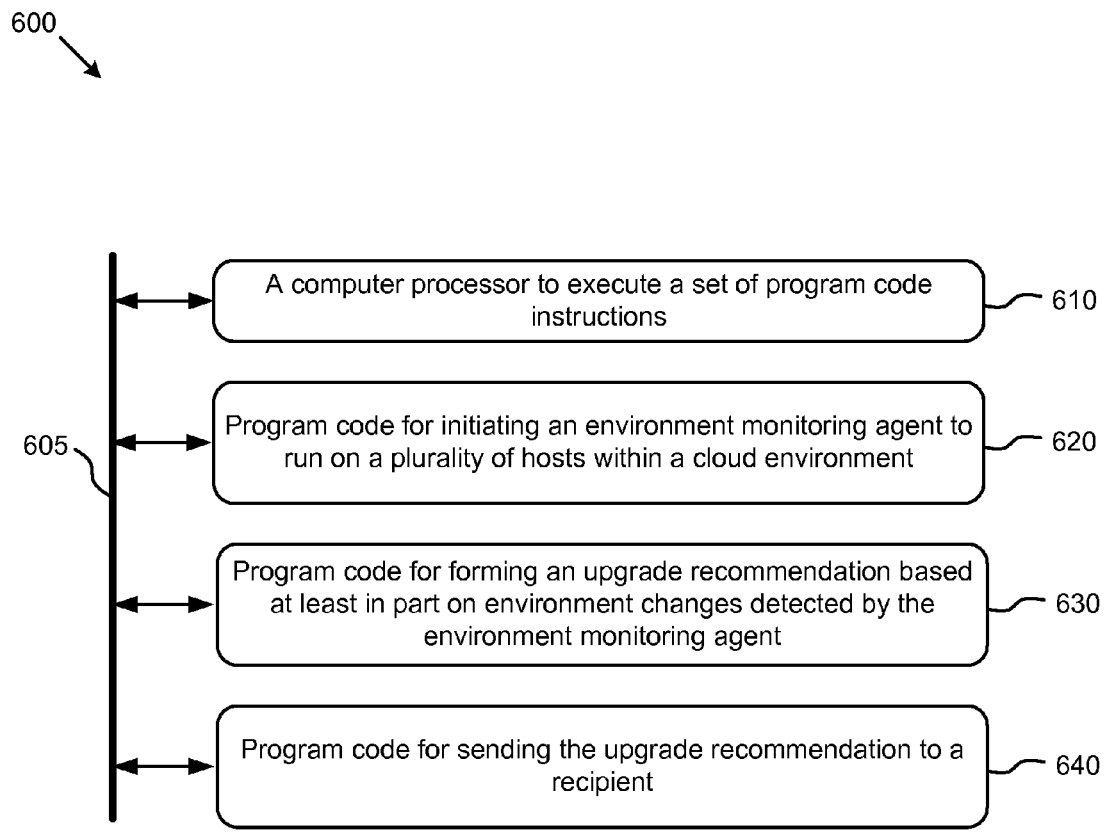
FIG. 6 is a block diagram of a system for forming an upgrade recommendation in a cloud computing environment, according to some embodiments.

FIG. 6 is a block diagram of a system 600 for forming an upgrade recommendation in a cloud computing environment. As an option, the present system 600 may be implemented in the context of the architecture and functionality of the embodiments described herein. Of course, however, the system 600 or any operation therein may be carried out in any desired environment.

As shown, system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims.

The embodiment of FIG. 6 implements a portion of a computer system, shown as system 600, comprising a computer processor to execute a set of program code instructions (see module 610) and modules for accessing memory to hold program code instructions to perform: initiating an environment monitoring agent to run on a plurality of hosts within a cloud environment (see module 620); forming an upgrade recommendation based at least in part on environment changes detected by the environment monitoring agent (see module 630); and sending the upgrade recommendation to a recipient (see module 640).

System Architecture Overview
Additional Practical Applications

Figure 7:
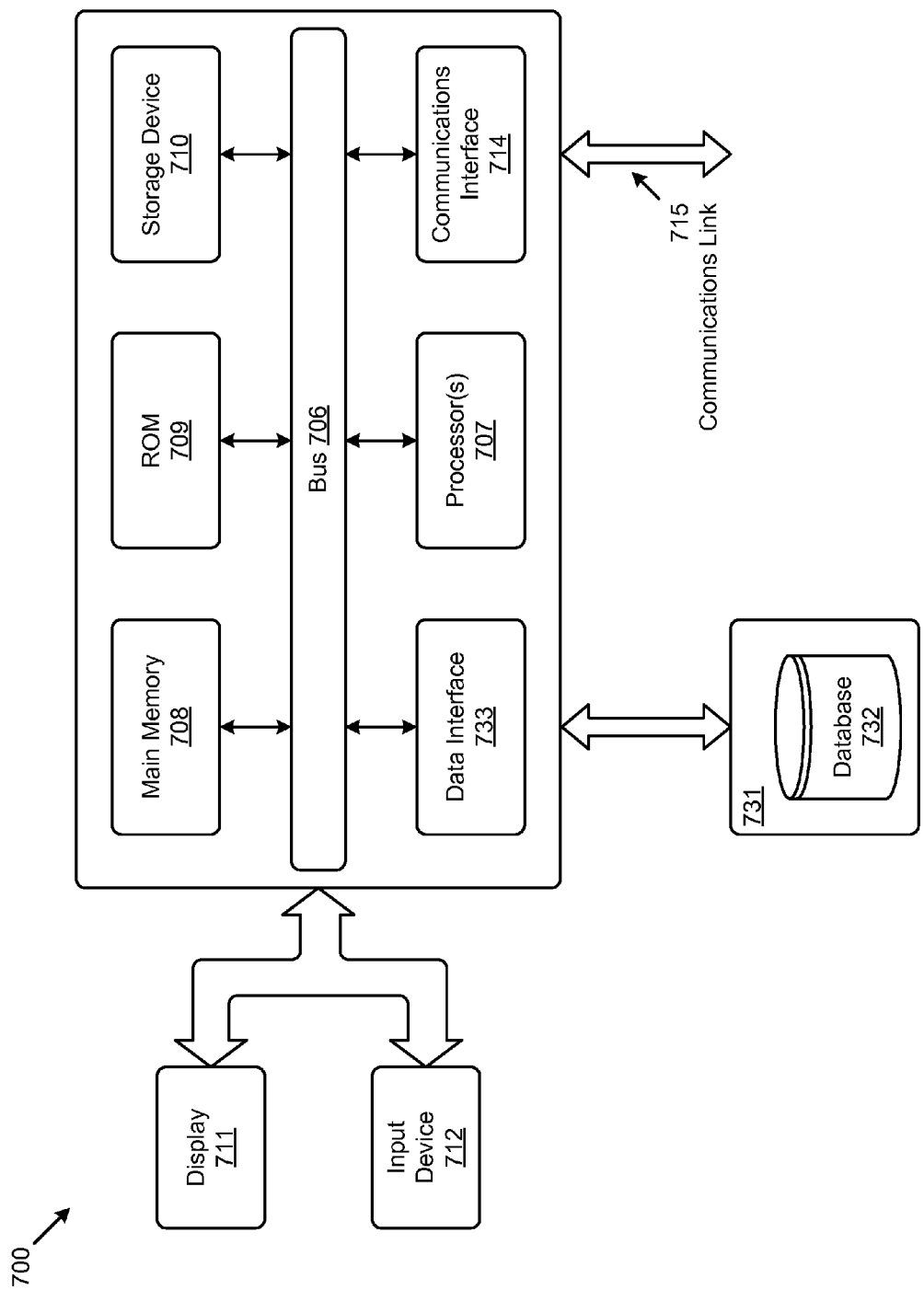
FIG. 7 depicts a block diagram of an instance of a computer system suitable for implementing an embodiment of the present disclosure.

FIG. 7 depicts a block diagram of an instance of a computer system 700 suitable for implementing an embodiment of the present disclosure. Computer system 700 includes a bus 706 or other communication mechanism for communicating information, which interconnects subsystems and devices, such as a processor 707, a system memory 708 (e.g., RAM), a static storage device (e.g., ROM 709), a disk drive 710 (e.g., magnetic or optical), a data interface 733, a communication interface 714 (e.g., modem or Ethernet card), a display 711 (e.g., CRT or LCD), input devices 712 (e.g., keyboard, cursor control), and an external data repository 731.

According to one embodiment of the disclosure, computer system 700 performs specific operations by processor 707 executing one or more sequences of one or more instructions contained in system memory 708. Such instructions may be read into system memory 708 from another computer readable/usable medium, such as a static storage device or a disk drive 710. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 700. According to certain embodiments of the disclosure, two or more computer systems 700 coupled by a communications link 715 (e.g., LAN, PTSN, or wireless network) may perform the sequence of instructions required to practice the disclosure in coordination with one another.

Computer system 700 may transmit and receive messages, data, and instructions, including programs (e.g., application code), through communications link 715 and communication interface 714. Received program code may be executed by processor 707 as it is received, and/or stored in disk drive 710 or other non-volatile storage for later execution. Computer system 700 may communicate through a data interface 733 to a database 732 on an external data repository 731. A module as used herein can be implemented using any mix of any portions of the system memory 708, and any extent of hard-wired circuitry including hard-wired circuitry embodied as a processor 707.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method comprising:
    initiating a plurality of environment monitoring agents to run on a plurality of respective hosts within a cloud environment, wherein each of the plurality of environment monitoring agents is configured to detect changes within its respective host, and wherein the changes include environment changes, new software installed, new network usage, and new file usage;
    forming an upgrade recommendation based on changes detected by at least one of the environment monitoring agents;
    sending the upgrade recommendation to a recipient; and
    calculating a wait-for event before sending a next upgrade recommendation.

2. The method of claim 1, wherein the plurality of environment monitoring agents are included as an instance image.

3. The method of claim 1, wherein the upgrade recommendation comprises an upgrade path.

4. The method of claim 3, wherein the upgrade path includes at least one of, a processor, a processor model, a processor stepping, or a device.

5. The method of claim 3, wherein the upgrade path includes at least one of, an operating system version, a software title, a software component, a middleware component, or a device driver.

6. The method of claim 1, wherein the upgrade recommendation comprises removal of a software component.

7. The method of claim 1, wherein the upgrade recommendation is formed based at least in part on a detected presence of at least one of, a directory on a file system, or a file on a file system.

8. The method of claim 7, wherein the upgrade recommendation is formed based at least in part on a detected port usage.

9. A computer program product embodied in a non-transitory computer readable medium, the computer readable medium having stored thereon a sequence of instructions which, when executed by a processor causes the processor to execute a process, the process comprising:
    initiating a plurality of environment monitoring agents to run on a plurality of respective hosts within a cloud environment, wherein each of the environment monitoring agents is configured to detect changes within its respective host, and wherein the changes include environment changes, new software installed, new network usage, and new file usage;
    forming an upgrade recommendation based on changes detected by at least one of the environment monitoring agents;
    sending the upgrade recommendation to a recipient; and
    calculating a wait-for event before sending a next upgrade recommendation.

10. The computer program product of claim 9, wherein the plurality of environment monitoring agents are included as an instance image.

11. The computer program product of claim 9, wherein the upgrade recommendation comprises an upgrade path.

12. The computer program product of claim 11 wherein the upgrade path includes at least one of, a processor, a processor model, a processor stepping, or a device.

13. The computer program product of claim 11 wherein the upgrade path includes at least one of, an operating system version, a software title, a software component, a middleware component, or a device driver.

14. The computer program product of claim 9, wherein the upgrade recommendation comprises removal of a software component.

15. The computer program product of claim 9, wherein the upgrade recommendation is formed based at least in part on a detected presence of at least one of, a directory on a file system, or a file on a file system.

16. The computer program product of claim 15 wherein the upgrade recommendation is formed based at least in part on a detected port usage.

17. A computer system comprising:
    a plurality of processor-implemented host computers interconnected within a cloud environment;
    a plurality of respective monitoring agents running on the plurality of processor-implemented host computers, wherein each of the plurality of monitoring agents is configured to detect changes within its respective host computer, and wherein the changes include environment changes, new software installed, new network usage, and new file usage;

a recommendation engine configured to form an upgrade recommendation based on changes detected by at least one of the monitoring agents;

a processor-implemented cloud server configured to publish the upgrade recommendation; and the processor-implemented cloud server configured to calculate a wait-for event before sending a next upgrade recommendation.

18. The computer system of claim 17, further comprising a database engine to store the upgrade recommendation.

* * * * *